United States Patent
Zhou et al.

(10) Patent No.: US 10,335,760 B2
(45) Date of Patent: Jul. 2, 2019

(54) METHOD FOR REDUCING OR CONTROLLING WASTEWATER AND POLLUTANT FROM EMULSION POLYMERIZATION RESIN PRODUCTION

(71) Applicant: Chinese Research Academy of Environmental Sciences, Beijing (CN)

(72) Inventors: Yuexi Zhou, Beijing (CN); Yudong Song, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 0 days.

(21) Appl. No.: 16/079,197

(22) PCT Filed: Feb. 22, 2017

(86) PCT No.: PCT/CN2017/074323
§ 371 (c)(1),
(2) Date: Aug. 23, 2018

(87) PCT Pub. No.: WO2017/143976
PCT Pub. Date: Aug. 31, 2017

(65) Prior Publication Data
US 2019/0046948 A1 Feb. 14, 2019

(30) Foreign Application Priority Data
Feb. 23, 2016 (CN) .......................... 2016 1 0098886

(51) Int. Cl.
*B01J 19/18* (2006.01)
*C02F 1/24* (2006.01)
(Continued)

(52) U.S. Cl.
CPC ............ *B01J 19/18* (2013.01); *B01D 17/042* (2013.01); *B01D 17/047* (2013.01);
(Continued)

(58) Field of Classification Search
CPC ...... B01J 19/18; B01J 19/006; B01J 19/0066; B01J 2219/00765; B01D 17/047;
(Continued)

(56) References Cited

FOREIGN PATENT DOCUMENTS

| CN | 1463930 A1 | 12/2003 |
|---|---|---|
| CN | 103693706 A | 4/2014 |

(Continued)

OTHER PUBLICATIONS

Chinese Office Action—Application No. 2016100988867—dated May 26, 2017.
(Continued)

*Primary Examiner* — Fred Prince
(74) *Attorney, Agent, or Firm* — Amster, Rothstein & Ebenstein LLP (57) ABSTRACT

The present invention provides a method for reducing or controlling wastewater and pollutant from emulsion polymerization resin production, comprising the following steps: (1) optimizing an emulsion polymerization reactor to lengthen a cleaning interval of the reactor so as to reduce the volumes of reactor cleaning wastewater and pollutant discharge; (2) demulsifying latex filter cleaning wastewater and removing a latex material so as to reduce the volume of the pollutant discharge; (3) demulsifying the highly concentrated reactor cleaning wastewater, then performing flotation recovery; (4) mixing graft polymerization wastewater and 1,3-diene polymerization wastewater, then performing demulsification; (5) mixing the demulsified latex wastewater and condensation and drying wastewater, then performing a coagulation and dissolved air flotation treatment; and (6) implementing a biological treatment process on the effluent from the coagulation and dissolved air flotation treatment to remove an organic material, nitrogen and phosphorus. The method of the present invention has the characteristics of
(Continued)

reducing pollutants at a source, increasing product yield, saving resources, using different treatment according to wastewater property, and lowering treatment cost.

12 Claims, 5 Drawing Sheets

(51) Int. Cl.
    *C02F 1/40*     (2006.01)
    *C02F 1/52*     (2006.01)
    *C02F 3/02*     (2006.01)
    *C08F 2/22*     (2006.01)
    *B01D 17/04*     (2006.01)
    *B01J 19/00*     (2006.01)
    *C02F 1/68*     (2006.01)
    *C02F 9/00*     (2006.01)
    *C02F 101/10*     (2006.01)
    *C02F 101/16*     (2006.01)
    *C02F 101/32*     (2006.01)
    *C02F 103/36*     (2006.01)

(52) U.S. Cl.
    CPC ......... *B01J 19/006* (2013.01); *B01J 19/0066* (2013.01); *C02F 1/24* (2013.01); *C02F 1/40* (2013.01); *C02F 1/52* (2013.01); *C02F 9/00* (2013.01); *C08F 2/22* (2013.01); *B01J 2219/00765* (2013.01); *C02F 1/5245* (2013.01); *C02F 1/682* (2013.01); *C02F 3/02* (2013.01); *C02F 2101/105* (2013.01); *C02F 2101/16* (2013.01); *C02F 2101/325* (2013.01); *C02F 2103/36* (2013.01)

(58) Field of Classification Search
    CPC . B01D 17/042; C08F 2/22; C02F 9/00; C02F 2101/16; C02F 3/02; C02F 1/682; C02F 1/5245; C02F 1/24; C02F 2103/36; C02F 2101/325; C02F 2101/105
    USPC ........................................ 210/620, 631, 705
    See application file for complete search history.

(56) References Cited

FOREIGN PATENT DOCUMENTS

| | | |
|---|---|---|
| CN | 103693820 A | 4/2014 |
| CN | 105712432 A | 6/2016 |
| KR | 20120073612 A | 7/2012 |
| WO | 2007011027 A1 | 1/2007 |

OTHER PUBLICATIONS

Chinese Office Action—Application No. 2016100988867—dated Jan. 10, 2018.
Chinese Notice of Allowance—Application No. 201610098886.7—dated May 10, 2018.

METHOD FOR REDUCING OR CONTROLLING WASTEWATER AND POLLUTANT FROM EMULSION POLYMERIZATION RESIN PRODUCTION

TECHNICAL FIELD

The present application relates to a method for reducing or controlling wastewater and pollutants in wastewater from emulsion polymerization resin production.

BACKGROUND

Emulsion polymerization is an important method for producing synthetic resins, and it is also a predominant process for producing synthetic resins such as ABS resin, polyvinyl chloride, polytetrafluoroethylene, polyvinyl alcohol, polymethyl methacrylate and so on. Since water is used as medium to form emulsion during the emulsion polymerization process for producing resins, then the polymer is separated from water for further processing, the volume of the wastewater produced is large, the concentration of the pollutant therein is high, and wherein there are polymers with high concentration which are difficult to be degraded and polymer monomers with relatively high toxicity. Thus, it is very difficult to process the wastewater and the pollutant.

The wastewater from the emulsion polymerization process for producing resins mainly comes from the emulsion polymerization section and condensation and drying section wherein the polymer is separated from the emulsion. The wastewater of the emulsion polymerization section mainly comes from the latex filter cleaning wastewater and the reactor cleaning wastewater, wherein the main pollutants are latex, the particle size of latex is small, thus the separation is difficult. The wastewater of condensation and drying section (or "the condensation and drying process wastewater") is usually an acidic wastewater with high temperature, which contains high content of dissolved pollutants and polymer powders with a relatively large particle size. The existing methods for processing the wastewater mostly comprise mixing the wastewater of different properties, followed by end-pipe treatment. However, these kinds of methods have many disadvantages, for example, high impact load, big processing difficulty, unstable effluent quality and high processing cost.

SUMMARY OF THE INVENTION

It is an object of the present application to provide a method for reducing or controlling wastewater and pollutant from emulsion polymerization resin production.

In general, the emulsion polymerization method for producing resins comprises the following steps:

1) polymerizing monomers in a reactor to obtain an emulsion with mixed polymer and water phases;
2) filtering the emulsion containing the polymer obtained in step 1) through a latex filter to obtain the polymer;
3) grafting the polymer obtained in step 2) in a reactor to obtain an emulsion with mixed grafted polymer and water phases;

4) filtering the emulsion containing the grafted polymer obtained in step 3) through a latex filter; and 5) condensing and drying the obtained polymer.

Step 3) and step 4) are optional steps, which can be selected if necessary.

The present application provides a method for reducing or controlling wastewater and pollutants from emulsion polymerization resin production, comprising the following step:

(A) preventing or reducing the adhesion of polymers to reactor walls.

By performing step (A), the method according to the present application can lengthen the reactor cleaning interval and reduce the discharged volumes of the wastewater and the pollutants from the reactor cleaning.

In some embodiments, the step (A) is carried out by at least one of the means selected from the group consisting of: adding a scraper on a reactor stirring blade, which can scrape the polymer adhered near the reactor wall during polymerization timely; employing a gate impeller and/or propeller agitator which can promote the mass and heat transfer of the mixed liquid between the center and the wall of the reactor; and/or installing a baffle near the reactor walls to prevent the mixed liquid from swirling as a whole.

The method for reducing or controlling wastewater and pollutant according to the present application further comprises: before mixing the wastewater, treating the wastewater corning from various steps of emulsion polymerization resin production to reduce the amounts of pollutants in the wastewater after mixing.

Figure 1:
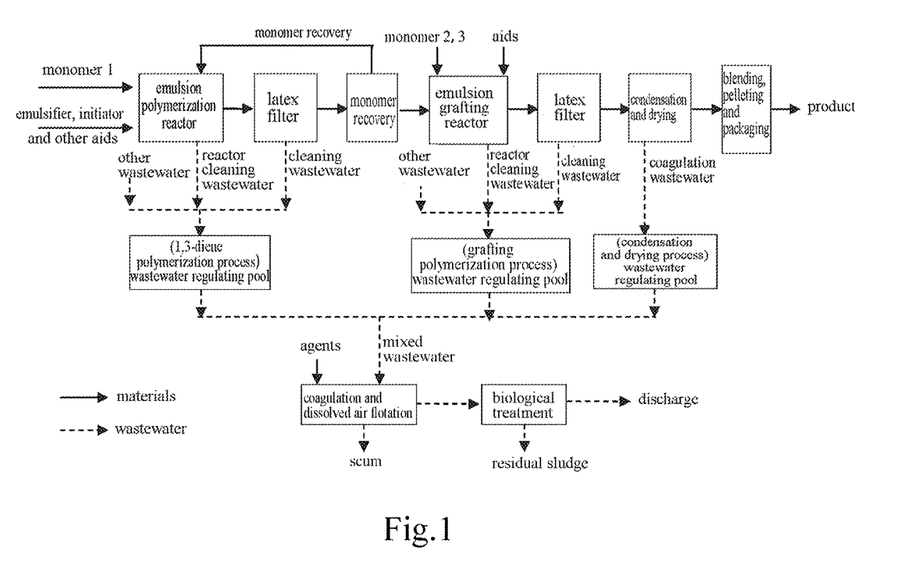
FIG. 1 is a conventional process for treating wastewater emulsion polymerization resin production.
Figure 2:
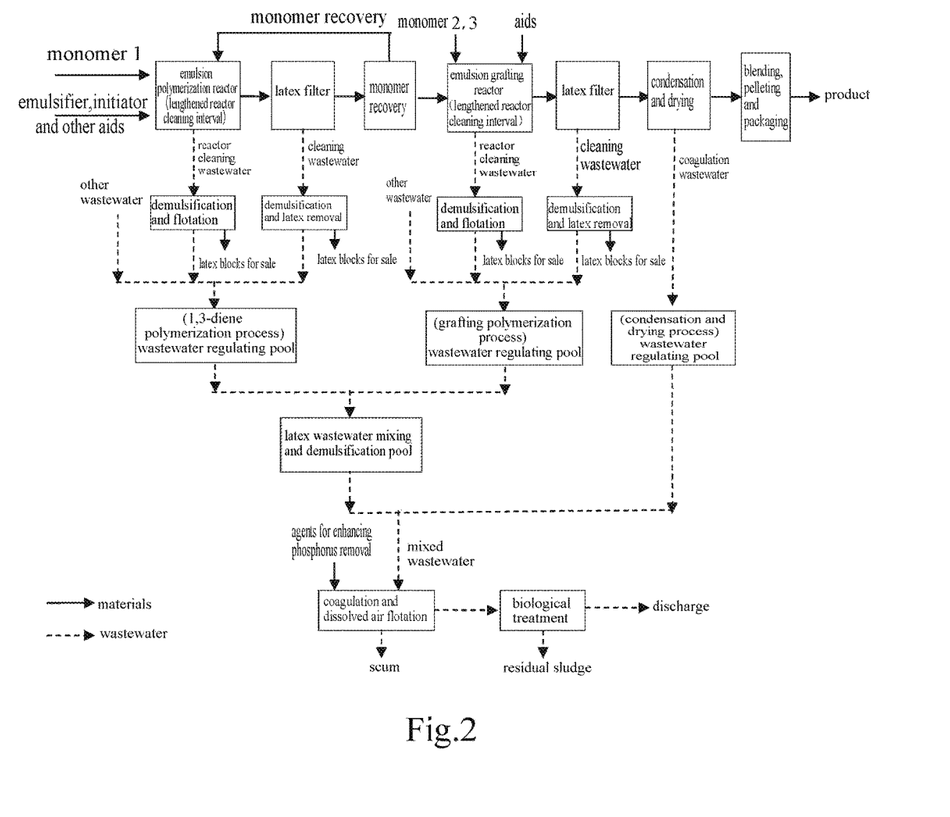
FIG. 2 is a process according to the present application for reducing and controlling the wastewater and the pollutants from emulsion polymerization resin production.
Figure 3:
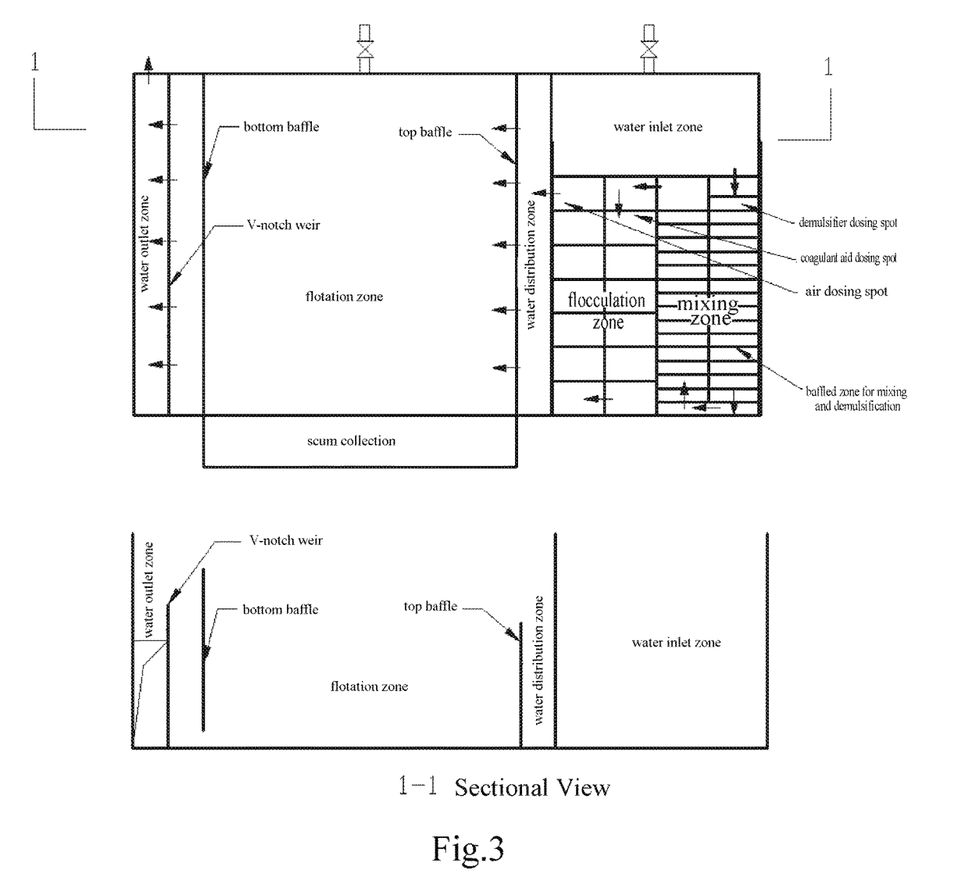
FIG. 3 is a schematic diagram of a demulsification flotation tank.
Figure 4:
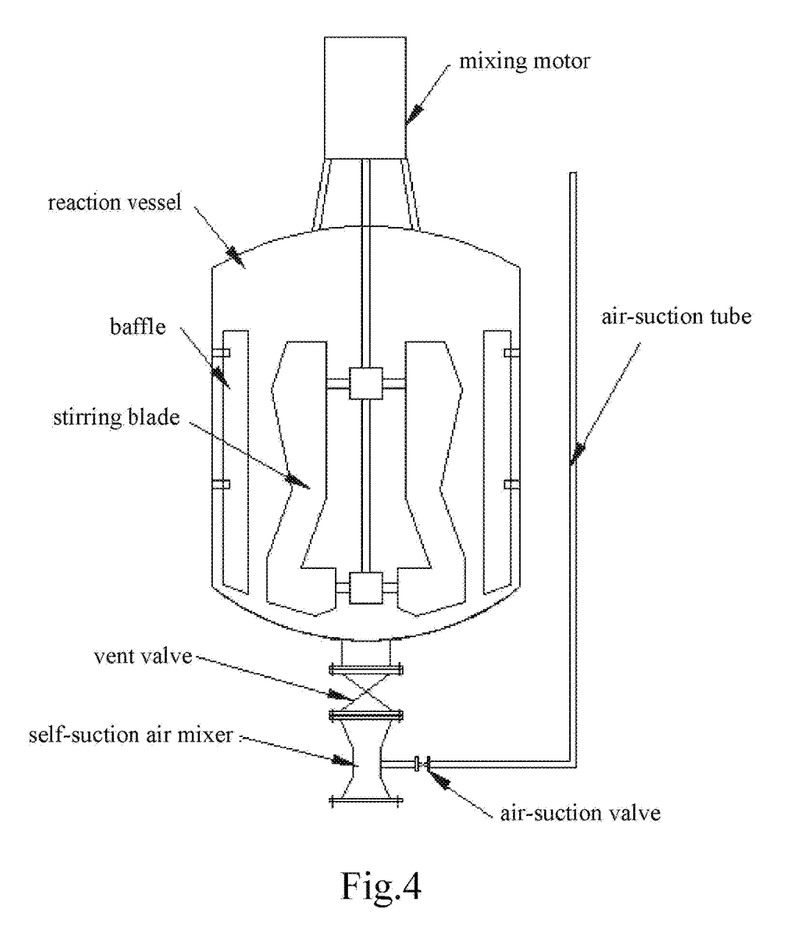
FIG. 4 is a schematic diagram of a reactor with a self-suction air mixer.
Figure 5:
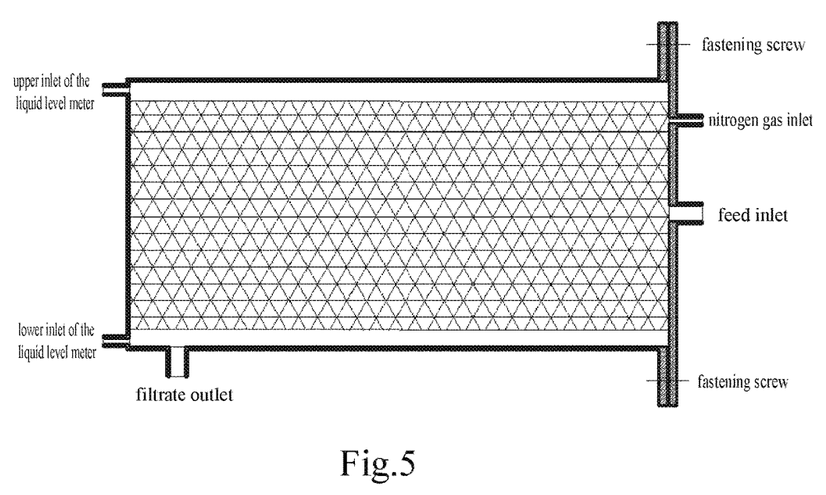
FIG. 5 is a schematic diagram of a low residue-liquid filter with nitrogen injection.

The method according to the present application can employ a filter such as a low-residue-liquid filter with nitrogen injection, which can reduce the loss of latex during filter cleaning and decrease the pollutant concentration in the cleaning wastewater (that is, after normal operating the filter, drain out the liquid residue inside the filter by using nitrogen, so as to ensure the filter has a low hold-up volume before cleaning), as shown in FIG. 5. Specifically, the low-residue-liquid filter with nitrogen injection can be configured with a nitrogen inlet on the top and a filtrate outlet on the bottom. When stopping filter operation, pass nitrogen gas into the filter slowly, push the liquid residue in the filter to the filtrate outlet, then carry out filter cleaning operation.

According to some embodiments of the present application, the method further comprises at least one step selected from the group consisting of:

(B) subjecting the wastewater discharged from the latex filter cleaning to demulsifying and degumming treatments (such as demulsifying and latex removing) to reduce the discharged pollutant volume in the wastewater; when having graft polymerization, preferably mixing the discharged wastewater after monomer (such as 1,3-butadiene) polymerization (referred to as latex wastewater) with the discharged wastewater after graft polymerization, then conducting demulsifying and degumming treatments;

(C) subjecting the wastewater discharged from the reactor cleaning to demulsifying and degumming treatments (such as demulsifying and flotation) to reduce the discharged pollutant volume in the wastewater;

(D) mixing the wastewater discharged from the latex filter cleaning and the wastewater discharged from the reactor cleaning, followed by demulsifying and degumming treatments to reduce the discharged pollutant volume in the wastewater.

According to some embodiments of the present application, the method further comprises at least one step selected from the group consisting of:

(E) mixing the wastewater obtained from the treatments of step (B), (C) or (D) with wastewater from condensation and drying treatments, in order for coagulation and dissolved air flotation treatments; and (F) treating the effluent from the coagulation and dissolved air flotation treatments by using biological treatment to remove organic matters, nitrogen and phosphorus.

The above step (B) is performed by filtering the latex obtained by monomer (such as 1,3-butadiene) polymerization and optional latex obtained by graft polymerization, and treating the wastewater from the latex filter cleaning, for example, by means of the demulsification and latex removal, i.e. by using steam heating and adding agents, to demulsify and form latex blocks, then remove the latex blocks to reduce the pollutants in the wastewater.

In the method according to the present application, the demulsification of the wastewater from the latex filter cleaning can be carried out by means including, but not limited to: heating with steam till 25 to 80° C. and adding a demulsifier selected from the group consisting of calcium chloride, magnesium chloride, polyaluminum chloride, polyferric chloride, polyferric sulfate and sulfuric acid. The amount of the demulsifier added is 100 to 5000 mg/L. Polyacrylamide can be used as a coagulant aid.

In the above step (C), the demulsification and degumming (such as demulsification and flotation) of the wastewater from the reactor cleaning can be carried out by at least one of the following two means: (1) adding a demulsifier directly to the reactor cleaning wastewater in the reactor, demulsifying under stirring, installing a self-suction air mixer at the outlet of the reactor, introducing the wastewater after demulsification passing the outlet with the air mixer to have air sucked (air sucked in an amount of 0.25 to 1 times of the wastewater volume), form micro-bubbles and adhere to latex flocs; introducing the wastewater having mixed air into a flotation tank to separate the latex from the water; (2) introducing the reactor cleaning wastewater to enter a separate demulsification and flotation tank directly, adding a demulsifier to demulsify and separate the latex from the water in the flotation tank. The amount of the air added is 0.25 to 1 times of the wastewater volume. The employed flotation tank may include a water inlet zone, a baffled zone for mixing and demulsifying, a zone for distributing water, a flotation zone, a water outlet zone and a system for adding agents. The demulsifier can be selected from calcium chloride and polyaluminum chloride, wherein the calcium chloride added is in an amount of 200 to 700 mg/L and the polymerization chloride is added in an amount of 25 to 75 mg/L. The coagulant aid is polyacrylamide and the amount added is 1 to 10 mg/L. The temperature for demulsifying is 35 to 70° C.

In step (D), the demulsifier for demulsifying the wastewater obtained by mixing the wastewater from grafting polymerization and latex wastewater from monomer (1,3-diene) polymerization can be selected from the group consisting of calcium chloride, magnesium chloride, polyaluminum chloride and any combinations thereof.

In step (E), the latex wastewater after demulsification and the wastewater from the condensation and drying treatment are mixed for coagulation and dissolved air flotation treatment, and the coagulation agent used herein is selected from the group consisting of polyaluminum chloride, polyferric chloride, aluminum sulfate, calcium chloride, and any combinations with ferric chloride and/or ferric sulfate. The amount of the agents added is 50 to 300 mg/L. The coagulant aid may be polyacrylamide and the amount added is 1 to 10 mg/L. The temperature is 20 to 60° C. The removal ratio for the polymer flocs is above 90% and the removal ratio for phosphorus is above 80%.

In step (F), the effluent from the coagulation and dissolved air flotation treatments is treated by using a biological treatment process to remove organic matters, nitrogen and phosphorus. The reactor for biological treatment includes a zone where the amount of the dissolved oxygen is above 0.4 mg/L together with a zone where the amount of the dissolved oxygen is below 0.2 mg/L, and the mixed liquid in the reactor circulates between these two zones. The circulation flow volume is 2 to 6 times of the influent flow volume. The hydraulic retention time is 30 to 48 hours.

The method for reducing or controlling the pollutant and the wastewater from emulsion polymerization resin productions according to the present application has at least one of the following advantages:

(1) Through optimization of production equipment and processes, the source of the pollutants is reduced, resources are recycled and the difficulty and cost for treating the wastewater are reduced. The concentration of the pollutants produced during the reactor cleaning process is high and the volume discharged thereof is large, which is one of the major discharge sources of pollutants of the wastewater in the emulsion polymerization section. Some reactor cleaning intervals of the prior art are below 30 batches. If 3 batches are carried out per day, then the reactor need to be cleaned every 10 days, which impacts the production efficiency of the reactor, resulting in large volumes of pollutants discharged and raw materials waste. However, according to the method of the present application, the reactor cleaning interval can be lengthened to above 100 batches and the volumes of the pollutants and the wastewater from the reactor cleaning can be reduced by more than 70%.

(2) By replacing the conventional latex filter by the low-residue-liquid filter with nitrogen injection of the present application, the volume of the liquid residue before the filter cleaning can be greatly reduced, leading to a reduction of consumption amount of the latex and the pollutant concentration in the reactor cleaning wastewater.

(3) By treating the wastewater respectively, the method according to the present application can achieve a good pollutant removal effect, while the cost for treating the wastewater is reduced. The latex filter cleaning wastewater has small volume and is discharged discontinuously, however, the pollutant concentration thereof is up to several hundred thousand mg/L, and the main pollutants are latex which has recycling values. By demulsification, the latex in the wastewater can be agglomerated into latex blocks which can be removed for sale, the impact load of the wastewater is reduced and the difficulty for treating the wastewater in subsequent steps can be decreased. The reactor cleaning wastewater has high concentrations of pollutants and large single-discharged volume with the main pollutants being latex, which tends to have impact load on the subsequent coagulation and dissolved air flotation-biological treatment units and influences the stability of the quality of the effluent. By demulsification and flotation, the latex with a high concentration in the wastewater can be removed and the impact load can be prevented. The wastewater from the graft polymerization and the latex wastewater from polymerization (such as 1,3-diene polymerization) are both latex wastewater, but there are large differences between these two emulsions' properties. The applicant found that, both the difficulty for demulsifying and the amounts of the agents needed for demulsifying these two wastewaters after mixing are significantly lower than demulsifying them separately. Therefore, these two kinds of wastewater should be mixed first, then demulsify, followed by mixing with the wastewater from the condensation and drying sections for treating.

(4) By using formulated coagulants, the latex and powder materials are removed, the phosphorus with high concentration are also removed and the processing loads of the subsequent biological treating units are decreased. In addition to organic polymer with high concentration, the wastewater from the emulsion polymerization resin production may also contain pollutants of nitrogen and phosphorus with high concentration. Although there are mature processes for biological removal of nitrogen and phosphorus, the removal of phosphorus is often limited by the degradable carbon source presented in the wastewater and produces large amounts of sludge with a high yield. Since there are coagulation and dissolved air flotation units in the emulsion polymerization equipment, the removal of organic polymer together with the phosphorus during the coagulation and dissolved air flotation section will decrease the load of the subsequent biological treating units significantly. Therefore, the present application provides the coagulants which can remove the organic polymers in the wastewater together with phosphorus.

The equipment for emulsion polymerization resin production and the method for reducing and controlling the wastewater and the pollutants according to the present application will be further described with reference to the accompanying drawings.

DETAILED DESCRIPTION

In the following, the method of the present application is illustrated by specific examples, but the scope of the present application is not limited to the examples.

Example 1

The settings of reactors for graft polymerization of ABS were modified. The anchor agitator was replaced by a gate impeller agitator. A rectangular baffle was installed near the reactor walls to prevent the mixed liquid from swirling as a whole. After optimization of the agitation, the cleaning intervals of the reactors for graft polymerization of ABS were lengthened from 60 batches to 100 batches. The amounts of the reactor cleaning wastewater and the pollutants produced were reduced by at least 40%.

Example 2

The settings of reactors for polymerization of butadiene were modified. An adaptive scraper was added on the original helical ribbon agitator. During agitating, the scraper was tightly attached to the reactor. After optimization of the agitation, the cleaning intervals of the reactors for polymerization of butadiene were lengthened from 30 batches to 112 batches. The amounts of the reactor cleaning wastewater and the pollutants produced were reduced by at least 73%.

Example 3

The settings of reactors for graft polymerization of ABS were modified. The double helical ribbon agitator was replaced by a propeller agitator. A rectangular baffle was installed near the reactor wall to prevent the mixed liquid from swirling as a whole. After optimization of the agitation, the cleaning intervals of the reactors for graft polymerization of ABS were lengthened from 28 batches to 102 batches. The amounts of the reactor cleaning wastewater and the pollutants produced were reduced by at least 73%. The frequency for cleaning the latex filter was decreased from four times/month to two times/month.

Example 4

In the process for emulsion polymerization (such as graft polymerization of ABS, emulsion polymerization of butadiene, emulsion polymerization of polytetrafluoroethylene and so on), the conventional cage filter was modified to a low-residue-liquid filter with nitrogen injection. The latex volume discharged for single filter cleaning operation was reduced by at least 82%.

Example 5

For the filter cleaning wastewater from the process for emulsion polymerization of butadiene, calcium chloride was used as a demulsifier and the amount added was 5000 mg/L. The demulsification was carried out at 40° C. and the latex was removed. Compared with that before demulsification, the COD of the wastewater was reduced by at least 95%.

Example 6

For the reactor cleaning wastewater with high concentration of pollutants from the process for graft polymerization of ABS, polyaluminum chloride or calcium chloride was used as a demulsifier, the amount added was 1000 mg/L, and the amount of PAM added was 2 mg/L. A separate baffle flotation tank was used, where the demulsification and flotation was carried out at 70° C. Compared with that before demulsification, the COD of the wastewater was reduced by at least 80%.

Example 7

The wastewater obtained by mixing the wastewater from butadiene polymerization and the wastewater from ABS graft polymerization was demulsified by adding calcium chloride, the amount added was 75 mg/L and the temperature was 20° C. Then the wastewater was mixed with the wastewater from condensation and drying treatments for the coagulation and dissolved air flotation treatment. A formulated coagulants composition comprising polyaluminum chloride, calcium chloride and ferric chloride (weight ratio is 50:40:10) was used and the amount added was 100 mg/L. PAM was used as coagulant aid and the amount added was 5 mg/L. The temperature was 50° C. COD removal was 43% and TP removal was 86%. Compared with a process having the same treating effects where the wastewater from butadiene polymerization, the wastewater from ABS graft polymerization and the wastewater from the condensation and drying treatments were mixed first, then subjected to coagulation and dissolved air flotation treatment by using polyaluminum chloride as coagulants, the cost for the agents was reduced by at least 56%.

Example 8

The effluent from the coagulation and dissolved air flotation treatment of Example 7 was treated with an A/O activated sludge reactor. The dissolved oxygen amount in the aerobic zone was controlled to be 1.0 mg/L and the dissolved oxygen amount in the anoxic zone was controlled to be 0.1 mg/L. The hydraulic retention time was 48 hours. In the effluent, the amount of TN was below 15 mg/L, the amount of nitrogen in ammonia was below 5 mg/L and the amount of TP was below 0.5 mg/L.

Example 9

According to the method of the present application, the equipment for producing ABS resins was modified according to Examples 1, 2 or 3 and Examples 4 to 8. Then the COD peak value of the effluent of the equipment was decreased from 6000 mg/L to below 2000 mg/L, which reduced the impact on the subsequent processing units and increased the quality stability of the effluent. The COD of the latex wastewater was reduced by more than 70% at the wastewater source and the cost for treating the wastewater was reduced by more than 50% (for example 51%).

The above Examples are only for describing the preferred embodiments of the present application and do not intend to limit the scope of the present application. Without departing from the spirit of the present application, various modifications and improvements made by those skilled in the art on the technical solutions of the present application should fall within the scope defined by the claims of the present application.

We claim:
1. A method for reducing or controlling wastewater and pollutants from emulsion polymerization resin production, comprising the following step:
 (A) preventing or reducing adhesion of polymers to reactor walls;
  wherein the step (A) is carried out by at least one of means selected from a group consisting of:
   (1) adding a scraper mounted on a reactor stirring blade;
   (2) employing a gate impeller and/or propeller agitator which can promote the mass and heat transfer of mixed liquid between the center and the walls of the reactor; and
   (3) installing a baffle near the reactor walls to prevent the mixed liquid from swirling as a whole; and
 further comprising at least one of the steps selected from the group consisting of:
 (B) subjecting wastewater discharged from latex filter cleaning to demulsifying and degumming treatments;
 (C) subjecting wastewater discharged from reactor cleaning to demulsifying and degumming treatments; and
 (D) mixing wastewater discharged from latex filter cleaning and wastewater discharged from reactor cleaning, followed by demulsifying and degumming treatments; and
 further comprising the step of:
 (E) mixing the wastewater obtained from step (B), (C) or (D) with wastewater from condensation and drying treatments, followed by coagulation and dissolved air flotation treatments.

2. The method according to claim 1 further comprising:
 (F) treating effluents from the coagulation and dissolved air flotation treatments by biological treatment to remove organic matters, nitrogen and phosphorus.

3. The method according to claim 2, wherein when conducting the biological treatment in the step (F), a reactor for biological treatment includes a zone where the amount of the dissolved oxygen is above 0.4 mg/L together with a zone where the amount of the dissolved oxygen is below 0.2 mg/L, and the mixed liquid in the reactor circulates between these two zones.

4. The method according to claim 1, wherein the latex filter is a low-residual-liquid filter with nitrogen injection.

5. The method according to claim 1, wherein when there is a graft polymerization in the emulsion polymerization, latex wastewater from monomer polymerization is mixed with wastewater discharged after the graft polymerization, followed by demulsifying and degumming treatments of the mixed wastewater.

6. The method according to claim 5, wherein a demulsifier added for demulsifying treatment is selected from the group consisting of calcium chloride, magnesium chloride, polyaluminum chloride and any combinations thereof, and the demulsifier is added in an amount of 20 to 100 mg/L, and the temperature for adding the demulsifier is 20 to 70° C.

7. The method according to claim 1, wherein the demulsifying treatment of the wastewater from the latex filter cleaning in step (B) is carried out by heating with steam till 25 to 80° C. and adding a demulsifier selected from the group consisting of calcium chloride, magnesium chloride, polyaluminum chloride, polyferric chloride, polyferric sulfate and sulfuric acid.

8. The method according to claim 1, wherein the demulsifying and degumming treatments of the wastewater from the reactor cleaning in the step (C) are carried out by at least one of means selected from a group consisting of:
 (1) adding a demulsifier directly to the reactor cleaning wastewater in the reactor, and demulsifying under stirring; installing a self-suction air mixer at an outlet of the reactor, passing the wastewater after demulsification through the outlet with an air mixer to have air sucked and form micro-bubbles which then adhere to latex flocs; introducing the wastewater mixed with air into a flotation tank to separate the latex from the water;
 (2) introducing the reactor cleaning wastewater into a separate demulsification and flotation tank directly, adding a demulsifier for demulsification, and separate the latex from the water in the flotation tank.

9. The method according to claim 8, wherein the demulsification and flotation tank is provided with a water inlet zone, a baffled zone for mixing and demulsifying, a water distribution zone, a flotation zone, a water outlet zone and a system for adding agents.

10. The method according to claim 1, wherein the demulsifier for demulsifying the reactor cleaning wastewater is selected from calcium chloride and polyaluminum chloride, and calcium chloride is added in an amount of 200 to 700 mg/L or polyaluminum chloride is added in an amount of 25 to 75 mg/L.

11. The method according to claim 1, wherein a coagulant is used for the coagulation treatment in the step (E), and the coagulant is selected from the group consisting of polyaluminum chloride, polyferric chloride, aluminum sulfate, calcium chloride, and any combinations with ferric chloride or ferric sulfate.

12. The method according to claim 1, wherein the resin is selected from the group consisting of ABS resin, polyvinyl chloride, polytetrafluoroethylene, polyvinyl alcohol and polymethyl methacrylate.

* * * * *